US012631111B2

(12) United States Patent　　(10) Patent No.:　US 12,631,111 B2
DiFoggio　　(45) Date of Patent:　May 19, 2026

(54) PRESSURE TUNED INFRARED LIGHT EMITTING DIODE FOR DOWNHOLE SPECTROSCOPY

(71) Applicant: Baker Hughes Oilfield Operations LLC, Houston, TX (US)

(72) Inventor: Rocco DiFoggio, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 272 days.

(21) Appl. No.: 18/402,966

(22) Filed: Jan. 3, 2024

(65) Prior Publication Data

US 2025/0215795 A1　　Jul. 3, 2025

(51) Int. Cl.
*E21B 49/08*　　(2006.01)
*G01J 3/427*　　(2006.01)
*G01N 21/31*　　(2006.01)
*G01N 21/85*　　(2006.01)

(52) U.S. Cl.
CPC ........ *E21B 49/0875* (2020.05); *E21B 49/081* (2013.01); *E21B 49/088* (2013.01); *G01J 3/427* (2013.01); *G01N 2021/3155* (2013.01); *G01N 2021/3181* (2013.01); *G01N 2021/855* (2013.01)

(58) Field of Classification Search
None
See application file for complete search history.

(56) References Cited

U.S. PATENT DOCUMENTS

| | | | |
|---|---|---|---|
| 7,817,285 B2 | 10/2010 | Difoggio | |
| 9,284,930 B2 | 3/2016 | Harwood | |
| 11,015,445 B2 * | 5/2021 | Lan | G01N 27/414 |
| 2013/0062514 A1 * | 3/2013 | Csutak | G01J 3/10 |
| | | | 250/262 |
| 2017/0051606 A1 * | 2/2017 | Fanini | E21B 47/10 |

OTHER PUBLICATIONS

Dybala, F. et al.; "Wavelength Tuning of InGaAs/GaAs Laser Diodes by the Application of High Hydrostatic Pressure" We.P.11, ICTON 2022; pp. 93-97.

* cited by examiner

*Primary Examiner* — Suman K Nath
(74) *Attorney, Agent, or Firm* — Bracewell LLP; Keith R. Derrington

(57)　　ABSTRACT

Fluid is sampled from a subterranean formation with a downhole tool from inside a wellbore intersecting the formation. The fluid is analyzed by a spectrometer inside the downhole tool. A light source in the spectrometer is pressure tuned to compensate for a change in wavelength of the output light due to a temperature change in the wellbore, and overlap with a compound of interest or analyte absorption band. The light source is in a fluid filled chamber, and a piezoelectric stack is in a cylinder that has an open end connected to the chamber. The fluid and the light source are selectively pressurized by expanding the piezoelectric stack at frequencies ranging up to at least around 1000 hertz. When pressurized, the output light wavelength is shifted to a range that coincides with a spectral response of a particular compound or compounds. The piezoelectric stack expands in response to electricity.

18 Claims, 5 Drawing Sheets

PRESSURE TUNED INFRARED LIGHT EMITTING DIODE FOR DOWNHOLE SPECTROSCOPY

BACKGROUND OF THE INVENTION

1. Field of Invention

The present disclosure relates to spectroscopic evaluation in a wellbore with a pressure tuned infrared light emitting diode.

2. Description of Prior Art

Fluid contained in subterranean formations is sampled and analyzed to identify zones of possible interest in a formation with regard to hydrocarbon bearing potential. This typically involves recovering a sample of any formation fluids present for later analysis in a laboratory environment while causing a minimum of damage to the tested formations. The formation sample is essentially a point test of the possible productivity of subsurface earth formations. Additionally, a continuous record of the control and sequence of events during the test is made at the surface. From this record, valuable formation pressure and permeability data as well as data determinative of fluid compressibility, density and viscosity can be obtained for formation reservoir analysis.

Generally, formation fluid sampling involves disposing a tool into a wellbore equipped with a sample port on its outer housing. Samples are obtained by extending a probe from the tool and pushing that probe up against the wall of the wellbore, then reducing the fluid pressure inside of the probe below formation fluid pressure so that fluid from the formation starts flowing into the tool. The sampled fluid is then analyzed, either within the tool or on surface. Analysis in the tool is sometimes includes spectroscopy, by irradiating the sampled fluid with a light of known wavelength and measuring light absorption. However, elevated temperatures downhole seriously reduce the sensitivity of quantum photodetectors, such as photodiodes (PDs) and charge coupled devices (CCDs).

SUMMARY OF THE INVENTION

Disclosed herein is an example method of characterizing a formation, which includes deploying into a wellbore that intersects the formation a downhole tool having a spectrometer, the spectrometer having a chamber, a light source in the chamber, a fluid in the chamber, a cylinder having an open end in communication with the chamber, and an electroactive member in the cylinder such as a piezoelectric stack or an electroactive polymer whose dimensions change with applied voltage thereby squeezing a high-temperature, electrically-nonconducting, inert fluid in which an Infrared Light Emitting Diode (IRED) is immersed in order to pressure-tune the wavelengths emitted by the IRED. To compensate for reduced light sensitivity and to improve signal-to-noise, a rapid on-peak, off-peak spectral difference technique is very useful approach. The method of this example also includes obtaining an amount of a sample fluid with the downhole tool, selectively shifting a wavelength of the light from the light source to a designated spectral range by adjusting the dimensions of the electroactive member, rapidly changing the pressure on an Infrared Light Emitting Diode (IRED), irradiating the sample fluid with this pressure-tuned wavelength of light, receiving transmitted light that passes through the sample fluid, and analyzing the transmitted light to identify the presence of a compound of interest, or analyte, in the sample fluid. The method alternatively further includes repeating the step of adjusting so that the wavelength of the light is alternated between an on-peak spectral range and an off-peak spectral range, where the on-peak spectral range is a range of wavelengths at which a discernable amount of the light is absorbed by the compound of interest, and wherein the off-peak spectral range is a range of wavelengths at which little light is absorbed by the compound of interest. Further in this alternative, the light is alternated between an on-peak spectral range and an off-peak spectral range at frequencies ranging up to about 10 hertz, up to about 100 hertz, at least up to about 1000 hertz, and all values between. The on-peak versus off-peak approach provides very up-to-date and very accurate baseline values (off-peak), which is critical to accurate quantification of the analyte when the analyte absorptivity is small. In an example, adjusting the dimensions of the electroactive member with an applied voltage controls a pressure of the fluid and the wavelengths emitted by the pressure-tuned light source. The light source optionally is an infrared light emitting diode. In examples, the method further includes monitoring a temperature of the light source, wherein the dimensions of the electroactive member is adjusted based on the monitored temperature. Elevated temperature shifts the IRED wavelengths to longer wavelengths whereas pressure shifts the IRED wavelengths to shorter wavelengths. By measuring the IRED temperature, one can adjust the pressure to compensate for the effects of temperature on the IRED. The method further optionally includes producing fluid from a zone in the formation based on the step of analyzing the transmitted light. In examples, the electroactive member is a stack of piezoelectric elements, an electroactive polymer, or a combination. The method optionally includes obtaining data comprising temperatures of the light source and wavelengths of light generated by the light source at the temperatures.

Also disclosed is an example of a downhole tool for characterizing a formation that includes a sample port, a sample line that selectively receives sample fluid from the sample port, and a spectrometer. The spectrometer of this example includes a chamber with a light source that emits a light, a fluid in the chamber, a cylinder having an open end in communication with the chamber, and an electroactive member in the cylinder having a selectively adjustable dimensions, so that when the size of the electroactive member is adjusted, a pressure in the fluid is changed, which shifts a wavelength of the light to a designated spectral range. The downhole tool further optionally includes one or more of a controller configured to adjust the electroactive member size and a temperature probe in communication with the light source, and where the controller adjusts the electroactive member size based on a temperature sensed by the temperature probe. The light source optionally is an infrared light emitting diode and fluid in the chamber optionally is a perfluorocarbon. In an example, the sample lines deliver sample fluid between windows that are substantially transparent to that light, so that when light emitted from the light source is directed towards the windows, the light passes through the windows and sample fluid to form transmitted light. A photodetector, such as a photodiode, is optionally included that receives the transmitted light and directs a corresponding signal to a processor for identifying compounds in the sample fluid. In an embodiment, the downhole tool further includes a housing, where the sample port is an opening in the housing or a probe extending radially from the housing. The electroactive member is optionally electroactive polymer, a piezoelectric material, or a combination.

BRIEF DESCRIPTION OF DRAWINGS

Some of the features and benefits of the present invention having been stated, others will become apparent as the description proceeds when taken in conjunction with the accompanying drawings, in which.

Figure 1:
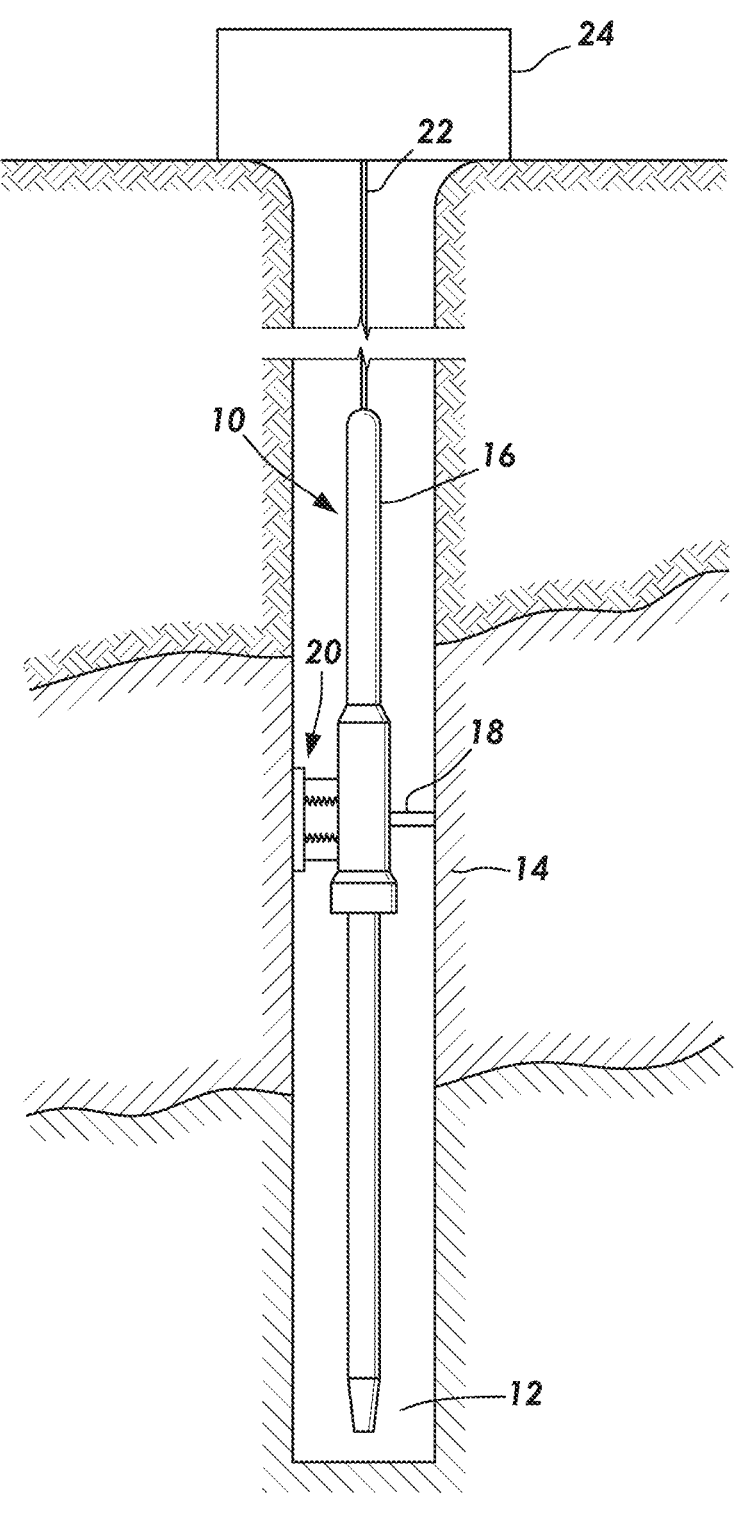
FIG. 1 is a side partial sectional view of sampling formation fluid with an example of a downhole tool.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

An example of a downhole tool 10 in a wellbore 12 is shown in a side partial sectional view in FIG. 1. Wellbore 12 is shown intersecting a subterranean formation 14, which has formation fluid FF within. Downhole tool 10 includes an outer housing 16, an annular probe 18 shown extending radially outward from housing 16, and a piston assembly 20 on a side of housing 16 spaced circumferentially away from probe 18. Piston assembly 20 is illustrated in a deployed configuration, exerting a force against a sidewall of wellbore 12; the force urges tool 16 in a radially opposite direction to insert probe 18 into the surrounding formation 14. A bore (not shown) inside probe 18 provides communication between formation 14 and to inside of housing 16. In an example of operation, formation fluid FF is drawn into tool 10 through probe 18. In an alternative, tool 10 is used to sample well fluid WF shown flowing inside wellbore 12; and as shown, well fluid WF enters tool 10 through a port 21 formed through housing 16. Tool 10 of FIG. 1 is deployed inside the wellbore 12 on wireline 22, which extends through a wellhead assembly 24 on surface. Optionally, an end of wireline 22 opposite tool 10 connects to a spool on a service truck (not shown) on surface. Shown schematically inside body 16 is a spectrograph 26, which as described in more detail below is for analyzing fluid sampled with the tool 10, e.g., formation fluid FF, well fluid WF, or both.

Figure 2A:
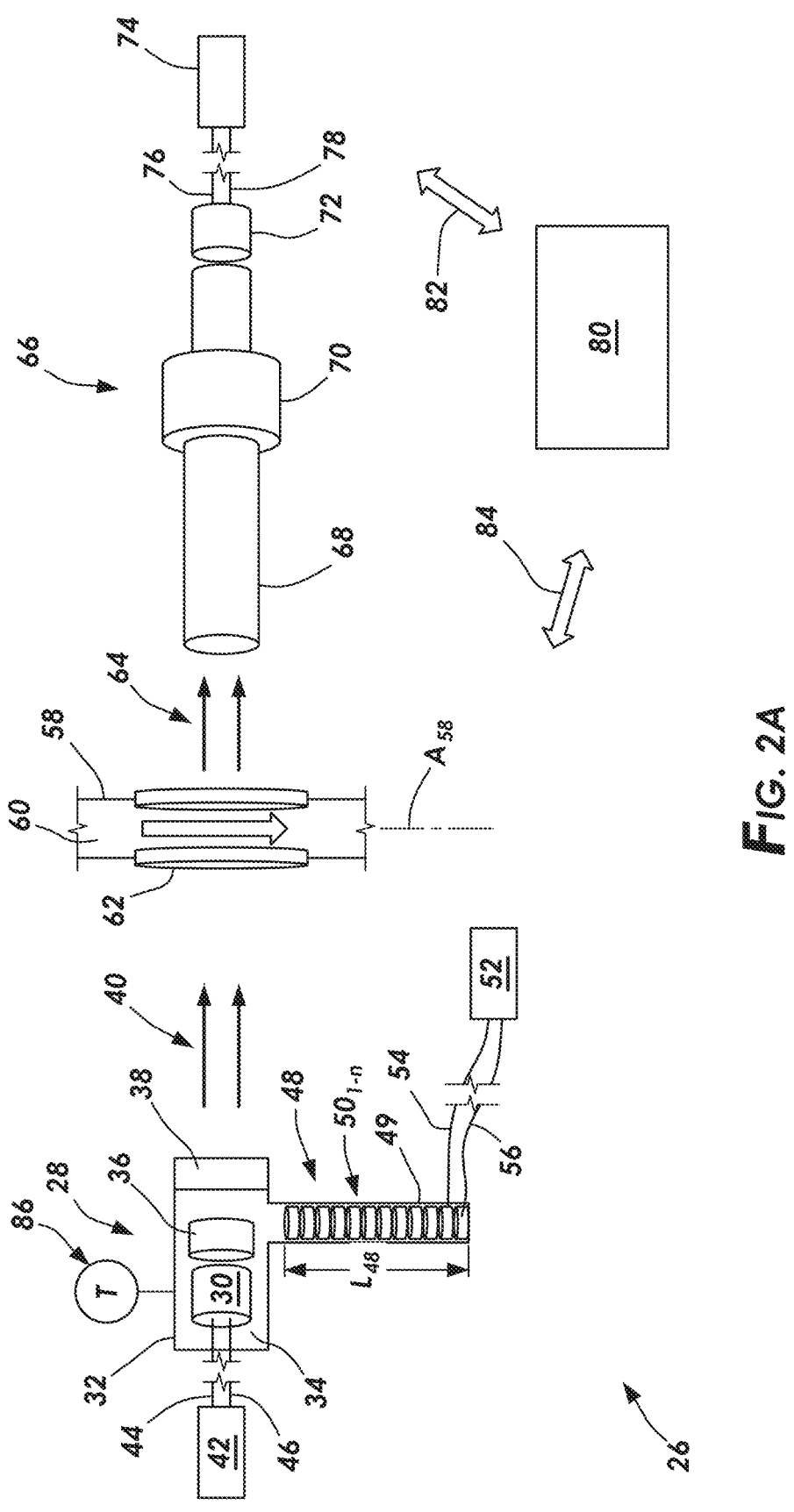
FIGS. 2A and 2B are schematic examples of a spectrometer for use with the downhole tool of FIG. 1.

A schematic example of the spectrograph 26 is shown in FIG. 2A. Included with spectrograph 26 is a light source 28 having a light emitting diode ("LED") 30 mounted inside of a sealed chamber 32. In examples, LED 30 is an infrared light emitting diode ("IRED"). The LED 30 is submerged in a packaging fluid 34 that is sealed within the chamber 32, in examples LED 30 is an infrared light emitting diode. As explained in more detail below, the pressure and temperature of packaging fluid 34 defines pressure and temperature ambient to the LED 30. In embodiments, the packaging fluid 34 includes a perfluorocarbon, such as Foblin®, which is available from Solvay at www.https//solvay.com or Fluorinert®, which is available from 3M at www.https://www.3m.com. A collimator 36 is adjacent LED 30, and a window 38 is formed in a sidewall of chamber 32 on the side of collimator 36 opposite LED 30. Light 40 generated by LED 30 is aligned within collimator 36, and passes through window 38 to exit chamber 32. A power source 42 is shown connected by leads 44, 46 to LED 30 and which selectively energizes LED 30 for generating light 40. An elongated stack 48 is shown in a cylinder 49, which has an open end intersecting a radial side wall of chamber 32. An end of cylinder 49 opposite chamber 32 is closed. The interface between the open end of cylinder 49 and chamber 32 is sealed so that fluid 34 is retained within chamber 32 and cylinder 49, and occupies the space inside chamber and cylinder 49 not occupied by stack 48, LED 30 and collimator 36. In the example FIG. 2A, the stack 48 is made up of a number of piezoelectric elements $50_{1-n}$. In alternatives, the stack 48 is made up of an electroactive polymer (not shown) or combinations of the electroactive polymer and piezoelectric elements. A power source 52 is schematically shown connected to the stack 48 via electrical leads 54, 56. As shown, the stack 48 is in a relaxed or unenergized state and having a length $L_{48}$.

Light 40 exiting light source 28 is directed to a sample line 58 shown positioned in a path of light 40. Inside sample line 58 is an amount of sample fluid 60; in examples, sample fluid 60 includes the formation fluid FF (FIG. 1), well fluid WF, or combinations. A section of line 58 intersected by light 40 is formed from a material that is transparent or diaphanous to the light 40 to define a window 62. In the example of FIG. 2A, window 62 is an annular member formed integrally in line 58, in alternatives, window 62 is made up of sections spaced apart from one another that each circumscribe a portion of line 58 about axis $A_{58}$. Window 62 is a barrier to a flow of sample fluid 60 from inside line 58 and provides a way for light 40 to penetrate through sidewalls of line 58 and interact with the sample fluid 60 inside line 58. Transmitted light 64 is formed by interaction of light 40 with sample fluid 60, and is shown exiting line 58 on a side of line 58 opposite light source 28, where it is received by a light detection system 66. A fiberoptic cable 68 in the light detection system 66 has an end that receives the transmitted light 64. Transmitted light 64 travels within cable 68 into a fiberoptic connector 70 on an end of cable 68 opposite line 58. A photodiode 72 attached to an end of connector 70 senses the transmitted light 64, and generates a corresponding signal, which is transmitted to a processor 74 via leads 76, 78. Processor 74 optionally evaluates characteristics of the signal 72 to obtain information about the transmitted light 74, such as its intensity, which when compared to an intensity of the generated light 40, yields information about particular compounds of interest that are included within the sample fluid 60. An optional controller 80 is schematically included in FIG. 2A and shown in communication with processor 74 via communication means 82; alternatively, controller 80 is in communication with one or both of the power supplies 42, 52 via communication means 84. Example communication means include hard wire, fiberoptic, wireless, and other forms of telemetry means.

Figure 2B:
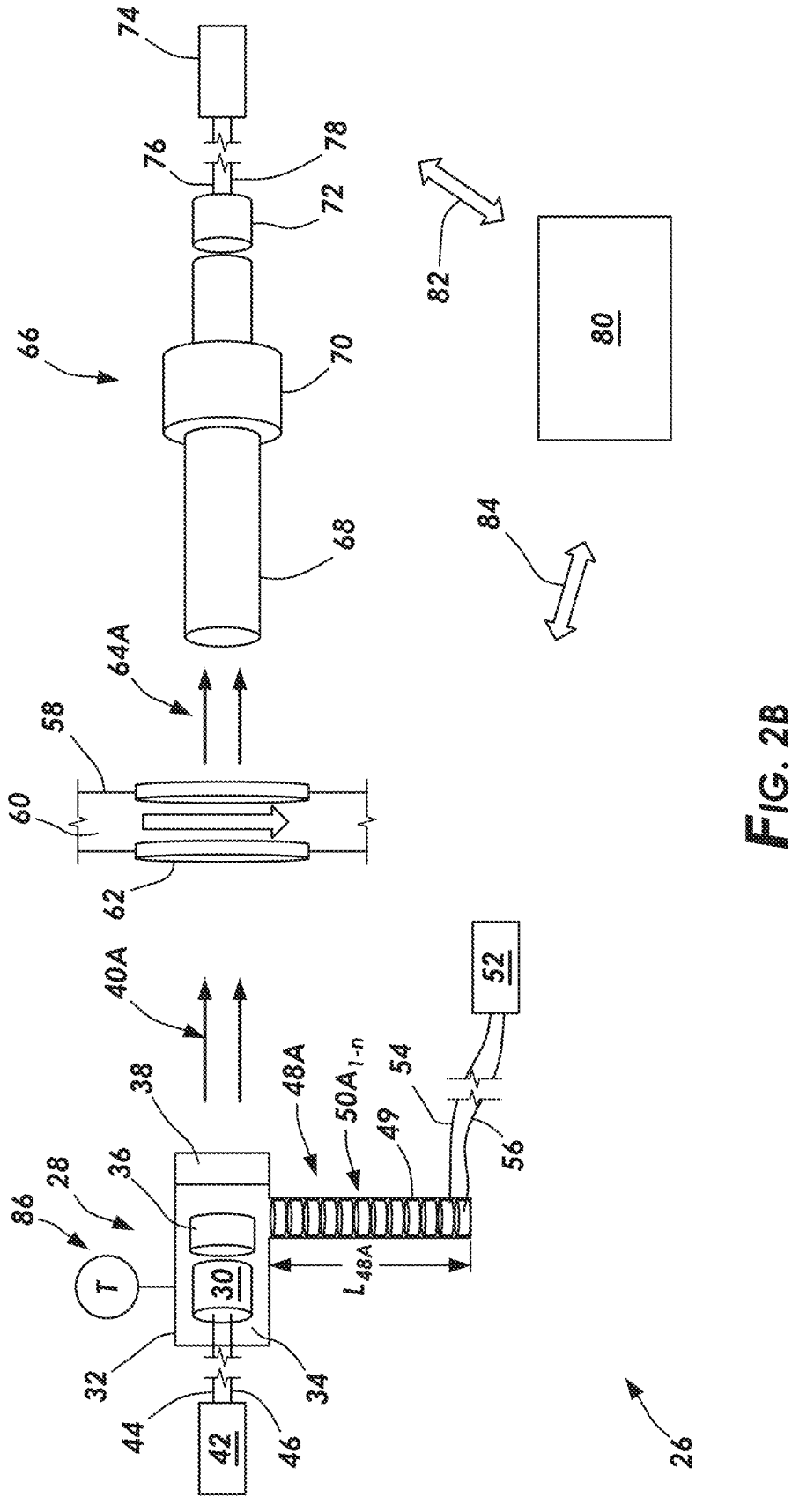

Referring now to FIG. 2B, shown is an example of the spectrometer 26 in which the light source 28 is being pressure tuned to compensate for temperature excursions of the LED 30 that alter a wavelength of the light 40 (FIG. 2A) emitted by the light source 28. Shown in this example is a thermocouple 86 in temperature communication with the LED 30 so that by monitoring output signals from thermocouple 86 a temperature of LED 30 is obtained. In the example of FIGS. 2A and 2B, thermocouple 86 is in signal communication with controller 80, which in alternatives provides a means for monitoring the temperature of the LED 30. Based on historical data of how characteristics of light generated by LED 30 vary in response to temperatures and pressures ambient to the LED 30, and a current ambient temperature of the LED 30, in a non-limiting example, pressure ambient to the LED 30 is controlled to shift a wavelength of light from the LED 30 to a designated wavelength or range of wavelengths. In the example of FIG. 2B, the pressure is controlled by expanding the piezoelectric stack 48 from an unexpanded configuration to an expanded configuration to form an expanded stack 48A having a length $L_{48A}$. In the expanded configuration, the fluid 34, also referred to herein optionally as pressure tuning fluid, pressure in the fluid 34 is at an increased pressure P+ and greater than an initial pressure $P_O$ when the stack 48 is in the unexpanded state. As explained in more detail below, increasing pressure of the fluid 34 shortens a wavelength of light 40 emitted from the LED 30, which is optionally performed to compensate for an increase of the wavelength due to an increase in temperature of fluid 34 and as monitored by the thermocouple 86.

Figure 3:
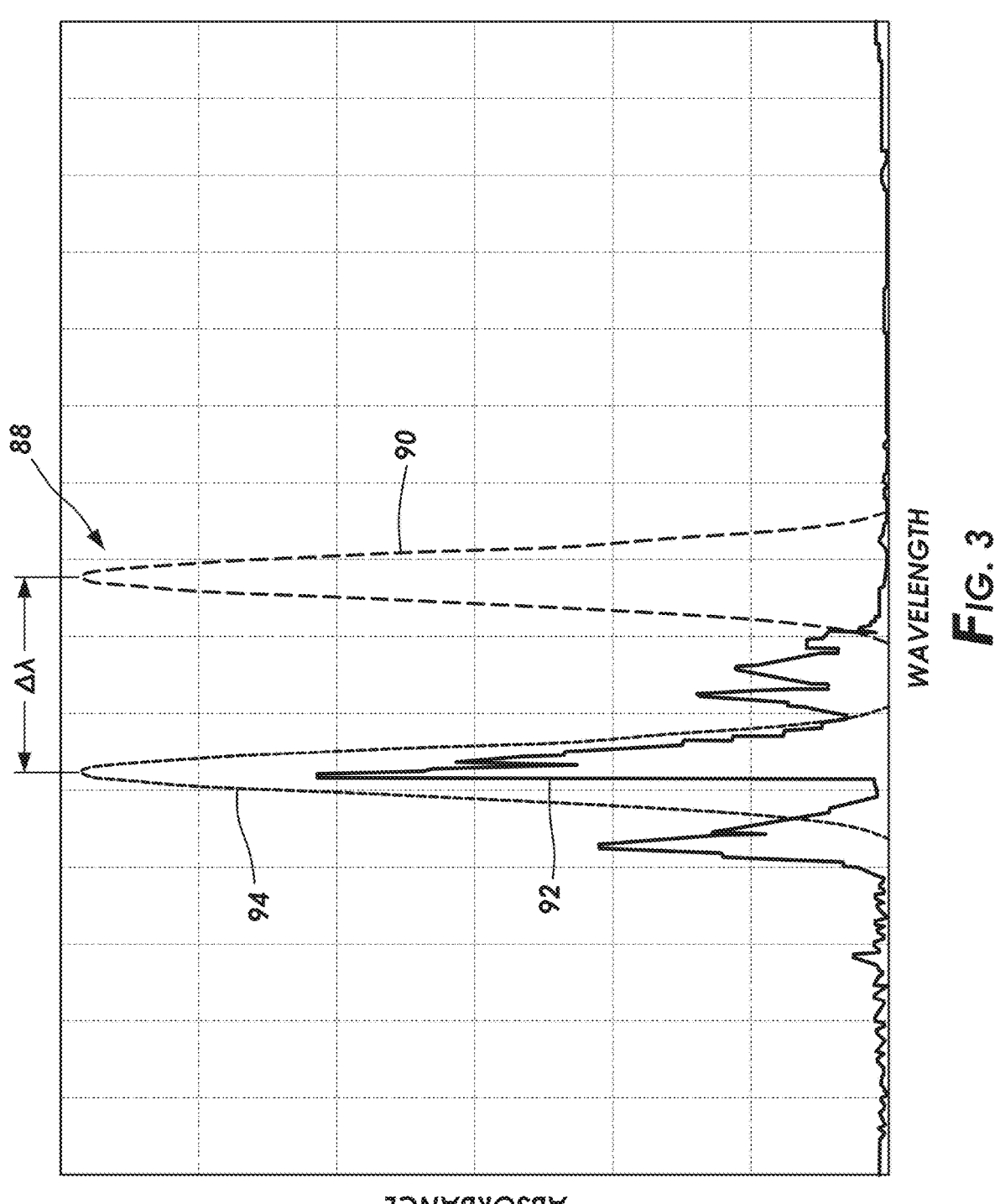
FIG. 3 is a spectral graph of a target compound and the light source of FIGS. 2A and 2B.

In FIG. 3 is a graph 88 having plots 90, 92, and 94. Plots 90 and 94 represent example spectral or intensity bands and plot 92 represents an example absorption band. More specifically, plot 90 represents an example of intensity versus wavelength of light 40 (FIG. 2A) emitted by LED 30 when light source 28 is at an increased temperature T+ and at initial pressure $P_O$. An example of an increased temperature T+ is a temperature that tool 10 of FIG. 1 is exposed to when deployed to a particular depth within wellbore 12, and an example of an initial pressure $P_O$ is a standard or atmospheric pressure. Plot 92 represents an absorption band of a substance of interest, the absorption band is a wavelength range of light absorbed by the substance of interest, and an example of a substance of interest is a particular compound identified in the sample fluid 60 (FIG. 2A). In alternatives, analyzing the absorption band quantifies an amount of the substance of interest in the sample fluid 60. Example substances of interest include hydrogen sulfide, carbon dioxide, carbon monoxide, hydrocarbons, and water. As shown in FIG. 3 plot 90 is offset from plot 92 by an amount represented by $\alpha\lambda$, so that little to no light having the wavelength represented by plot 90 will be absorbed by the substance of interest. In a non-limiting example of operation, the wavelength of light 40 emitted by LED 30 varies in response to pressure ambient to the LED 30; further in this example, plot 94 represents intensity versus wavelength of light 40 emitted by LED 30 when LED 30 is at temperature T+ and at an increased or tuned pressure P+, where P+ is greater than $P_O$. In alternatives, the pressure of packaging fluid 34 (FIG. 2A) and also pressure ambient to LED 30 is increased to the tuned pressure P+ by expanding stack 48 to a designated length. As shown in FIG. 3 and as represented by plot 94, the intensity band of light 40 emitted by LED 30 is shifted by an amount substantially equal to $\alpha\lambda$ to define a pressure tuned intensity band, which is superimposed over plot 92. In this example, the light 40 emitted from pressure tuned LED 30 has a range of wavelengths coincident with wavelengths in the absorption band of the substance of interest, so that at least a portion of light 40 from the pressure tuned LED 30 is absorbed by the sample fluid 60 (FIG. 2A); which reduces the intensity of resulting transmitted light 64, and when compared to the intensity of the generated light 40 yields a difference that indicates a presence/amount of a substance of interest. For the purposes of discussion herein, plot 90 represents an "off peak" scenario and plot 94 represents an "on peak" scenario.

In one example, the presence of hydrogen sulfide in the sample fluid 60 is being monitored by shifting the wavelength of the light 40 being emitted by the LED 30 to have a bandwidth of from about 1950 nm to about 2050 nm. In examples, magnitude of length $L_{48A}$ is variable so that pressure inside chamber 32 and cylinder 49 is variable to a wide range of values depending on the monitored temperature of LED 30.

Figure 4:
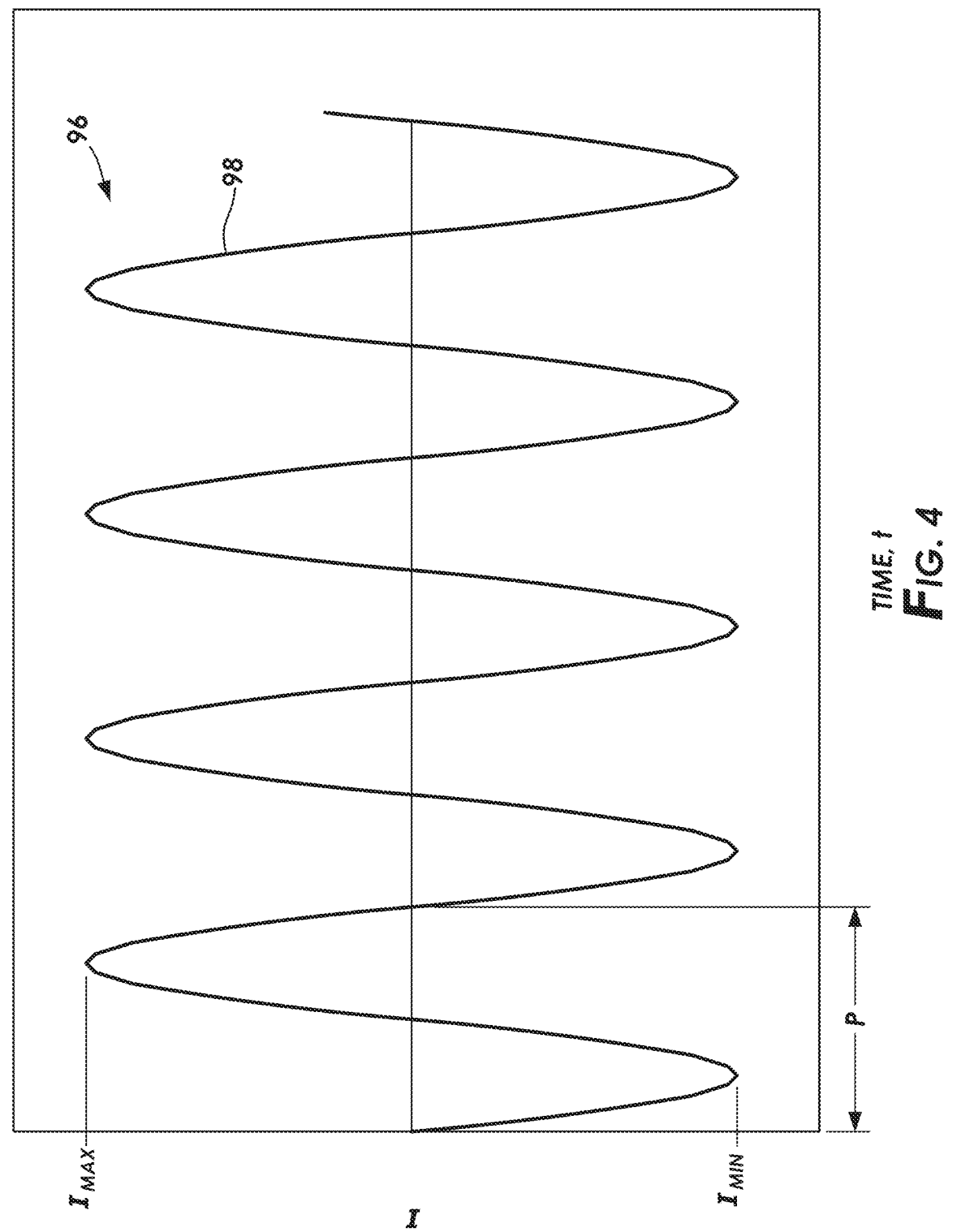
FIG. 4 is a graph of intensity over time of the light source of FIG. 2B.

In one alternative, the stack 48 is cycled between unexpanded and expanded configurations at different frequencies to shift the spectral bands of light generated by LED 30 of light source 28 (represented by plots 90, 94) is changed between on peak and off peak scenarios (as depicted by the plots 92, 94). Referring now to FIG. 4, shown is a graph 96 having plot 98 illustrating switching between on peak and off peak. Example frequencies of cycling include up to about 10 hertz, up to about 100 hertz, and up to at least about 1,000 hertz. An advantage of the use of an electroactive substance, such as the piezoelectric elements $50_{1-n}$, is that these elements respond extremely rapidly (e.g., within 100 microseconds), so that rapidly switching between on peak and off peak is attainable in short time periods. In examples, switching at these rates allows the use of a lock-in amplifier (phase sensitive detection) or a similar technique to recover small signals out of noise by greatly improving the signal-to-noise The responsive piezoelectric elements $50_{1-n}$ substantially reduces opportunities for drift in the circuitry to allow for a more precise and accurate evaluation of the transmitted light 64. In the example of FIG. 4, the maximum intensity is shown spaced vertically from the minimum intensity where these values of intensity of plot 98 across a horizontal line are represented by a period P which in examples is maintained constant throughout the cycling of the stack 48.

In an embodiment, a determination affecting operations in the wellbore 12 (FIG. 1) is based on an analysis of well fluid WF and/or formation fluid FF using an example of the spectrometer 26 (FIG. 2B) disclosed herein; where an example of a wellbore operation includes perforating the wellbore 12 at a particular depth and producing fluid at that depth. Examples of perforating are disclosed in Stolboushkin, U.S. Pat. No. 9,470,062 and McCann et al, U.S. Pat. No. 9,175,553; which are assigned to the assignee of the present application and incorporated herein in their entireties and for all purposes.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. In an alternative embodiment, fluid 34 (FIG. 2A) is pressurized in chamber 32 using a fuel injector, as described in, https://www.bosch-mobility.com/en/solutions/injectors/piezo-injector-cri3, which is compact and can reach pressures up to 2700 bar or 39160 psi. These and other similar modifications will readily suggest themselves to those skilled in the art, and are intended to be encompassed within the spirit of the present invention disclosed herein and the scope of the appended claims.

What is claimed is:

1. A method of characterizing a formation comprising:
deploying into a wellbore that intersects the formation a downhole tool having a spectrometer, the spectrometer comprising a chamber, a light source in the chamber, a fluid in the chamber, a cylinder having an open end in communication with the chamber, and an electroactive member in the cylinder;
obtaining an amount of a sample fluid with the downhole tool;
selectively shifting a wavelength of the light from the light source to a designated spectral range by adjusting a dimension of the electroactive member;
irradiating the sample fluid with the wavelength shifted light;
receiving transmitted light that passes through the sample fluid; and
analyzing the transmitted light to identify the presence of a compound of interest in the sample fluid.

2. The method of claim 1, further comprising repeating the step of adjusting so that the wavelength of the wavelength shifted light is alternated between an on-peak spectral range and an off-peak spectral range, wherein the on-peak spectral range is a range of wavelengths at which a discernable amount of the wavelength shifted light is absorbed by the compound of interest, and wherein the off-peak spectral range is a range of wavelengths at which a discernable amount of the wavelength shifted light is not absorbed by the compound of interest.

3. The method of claim 2, wherein the wavelength shifted light is alternated between an on-peak spectral range and an off-peak spectral range at frequencies ranging up to about 10 hertz, up to about 100 hertz, at least up to about 1000 hertz, and all values between.

4. The method of claim 1, wherein adjusting a dimension of the electroactive member controls a pressure of the fluid and the light source.

5. The method of claim 1, wherein the light source comprises an infrared light emitting diode.

6. The method of claim 1, further comprising monitoring a temperature of the light source, wherein the dimension of the electroactive member is adjusted based on the monitored temperature.

7. The method of claim 1, further comprising producing formation fluid from a zone in the formation based on the step of analyzing the transmitted light.

8. The method of claim 1, wherein the electroactive member is selected from the group consisting of a stack of piezoelectric elements, an electroactive polymer, and combinations thereof.

9. The method of claim 1, further comprising obtaining data comprising temperatures of the light source and wavelengths of light generated by the light source at the temperatures.

10. A downhole tool for characterizing a formation comprising:
a sample port;
a sample line that selectively receives sample fluid from the sample port; and
a spectrometer comprising,
a chamber with a light source that emits a light;
a fluid in the chamber,
a cylinder having an open end in communication with the chamber, and
an electroactive member in the cylinder having a selectively adjustable size, so that when the size of the electroactive member is adjusted, a pressure in the fluid is changed, which shifts a wavelength of the light to a designated spectral range.

11. The downhole tool of claim 10, further comprising a controller configured to adjust the electroactive member size.

12. The downhole tool of claim 11, further comprising a temperature probe in communication with the light source, and wherein the controller adjusts the electroactive member size based on a temperature sensed by the temperature probe.

13. The downhole tool of claim 10, wherein the light source comprises an infrared light emitting diode.

14. The downhole tool of claim 10, wherein the fluid in the chamber comprises a perfluorocarbon.

15. The downhole tool of claim 10, wherein the sample line include windows that are substantially diaphanous to the light, so that when the light emitted from the light source is directed to the windows while sample fluid is inside the sample line, the light passes through the windows and sample fluid to form transmitted light.

16. The downhole tool of claim 15, further comprising a photodiode that receives the transmitted light and directs a corresponding signal to a processor for identifying compounds in the sample fluid.

17. The downhole tool of claim 10, further comprising a housing, wherein the sample port is selected from the group consisting of an opening in the housing and a probe extending radially from the housing.

18. The downhole tool of claim 10, wherein the electroactive member is selected from the group comprising an electroactive polymer, a piezoelectric material, and combinations.

* * * * *